(12) United States Patent     (10) Patent No.: US 12,684,625 B2

Pezhumkad Balakrishna et al.     (45) Date of Patent: Jul. 14, 2026

(54) RANDOM ACCESS CHANNEL PREAMBLE ASSIGNMENTS FOR DUAL CONNECTIVITY

(71) Applicant: T-MOBILE INNOVATIONS LLC, Overland Park, KS (US)

(72) Inventors: Reman Pezhumkad Balakrishna, Nutley, NJ (US); Michael Chanicka, Corona, CA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/444,400

(22) Filed: Feb. 16, 2024

(65) Prior Publication Data

US 2024/0196447 A1     Jun. 13, 2024

Related U.S. Application Data

(63) Continuation of application No. 17/563,941, filed on Dec. 28, 2021, now Pat. No. 11,910,448.

(51) Int. Cl.

| | |
|---|---|
| *H04W 74/0833* | (2024.01) |
| *H04W 74/04* | (2009.01) |
| *H04W 74/0838* | (2024.01) |
| *H04W 76/15* | (2018.01) |

(52) U.S. Cl.
CPC ....... *H04W 74/0841* (2013.01); *H04W 74/04* (2013.01); *H04W 74/0833* (2013.01); *H04W 74/0838* (2024.01); *H04W 76/15* (2018.02)

(58) Field of Classification Search
CPC ............. H04W 74/04; H04W 74/0833; H04W 74/0838; H04W 74/0841; H04W 76/15
See application file for complete search history.

(56) References Cited

U.S. PATENT DOCUMENTS

| | | | |
|---|---|---|---|
| 9,137,827 B1* | 9/2015 | Marupaduga | ......... H04W 72/04 |
| 11,051,186 B1 | 6/2021 | Pawar et al. | |
| 11,363,495 B1 | 6/2022 | Marupaduga | |
| 2014/0241317 A1 | 8/2014 | Jamadagni et al. | |
| 2015/0215965 A1 | 7/2015 | Yamada | |

(Continued)

OTHER PUBLICATIONS

3GPP TS 38.306, "3rd Generation Partnership Project; Technical Specification Group Radio Access Network; NR; User Equipment {UE) radio access capabilities", 3GPP Organizational Partners, (Dec. 2021), pp. 1-156, V16.7.0.

(Continued)

*Primary Examiner* — Kashif Siddiqui

(74) *Attorney, Agent, or Firm* — SHOOK, HARDY & BACON L.L.P.

(57)          ABSTRACT

Embodiments of the present disclosure are directed to systems and methods for managing random access for devices seeking access to dual connectivity. Both master nodes and secondary nodes in dual connectivity have 64 available preambles that can be used for random access. By reserving preambles for devices that are requesting access to dual connectivity, a radio access network can assign random access preambles to said devices, enabling them to use contention free random access to gain access to both a master node and a secondary node. In some aspects random access preambles will only be assigned to devices requesting access to dual connectivity if they have a sufficiently high priority level.

20 Claims, 4 Drawing Sheets

(56) References Cited

U.S. PATENT DOCUMENTS

| | | | |
|---|---|---|---|
| 2015/0373559 A1 | 12/2015 | Hong | |
| 2016/0095004 A1 | 3/2016 | Tseng | |
| 2016/0112164 A1* | 4/2016 | Worrall | H04W 52/0206 |
| | | | 370/329 |
| 2016/0127961 A1 | 5/2016 | Wang et al. | |
| 2016/0212770 A1 | 7/2016 | Lee et al. | |
| 2018/0368016 A1 | 12/2018 | Lee et al. | |
| 2019/0166646 A1 | 5/2019 | Shih et al. | |
| 2019/0200406 A1 | 6/2019 | Henttonen et al. | |
| 2019/0215749 A1* | 7/2019 | Shih | H04W 36/0069 |
| 2019/0306768 A1* | 10/2019 | Kim | H04W 36/302 |
| 2019/0342932 A1 | 11/2019 | Futaki et al. | |
| 2020/0037387 A1 | 1/2020 | Lee et al. | |
| 2020/0092210 A1 | 3/2020 | Thanneeru et al. | |
| 2020/0178128 A1 | 6/2020 | Ingale et al. | |
| 2020/0260325 A1 | 8/2020 | Futaki et al. | |
| 2020/0351643 A1 | 11/2020 | Dhanapal et al. | |
| 2021/0243590 A1 | 8/2021 | Jin et al. | |
| 2021/0368568 A1 | 11/2021 | Jangid et al. | |
| 2022/0167432 A1* | 5/2022 | Lee | H04W 72/0446 |

OTHER PUBLICATIONS

3GPP TS 38.331, "3rd Generation Partnership Project; Technical Specification Group Radio Access Network; NR; Radio Resource Control {RRC) protocol specification", 3GPP Organizational Partners, (Dec. 2021), pp. 1-963, V16.7.0.
3GPP TS 38.423, "3rd Generation Partnership Project; Technical Specification Group Radio Access Network;NG-RAN; Kn application protocol {XnAP)", 3GPP Organizational Partners, (Dec. 2021), pp. 1-467, V16.8.0.

* cited by examiner

RANDOM ACCESS CHANNEL PREAMBLE ASSIGNMENTS FOR DUAL CONNECTIVITY

CROSS-REFERENCE TO RELATED APPLICATIONS

This application is a continuation of U.S. patent application Ser. No. 17/563,941, filed on Dec. 28, 2021, and entitled Random Access Channel Preamble Assignments for Dual Connectivity, the entirety of which is incorporated herein by reference.

BACKGROUND

The present disclosure is directed, in part to improved ways of handling the random access channel preamble assignment for dual connectivity connections, substantially as shown and/or described in connection with at least one of the Figures, and as set forth more completely in the claims.

According to various aspects of the technology, random access preambles are reserved based on a determination that a UE that is using the random access process to gain access to cells for network access associated with a dual connectivity session. When a UE requests access to a network having a shared channel, such as modern wireless telecommunication networks, it must contend with other UEs to effectively connect to and/or transmit data through the shared channel. Conventionally, the contention was resolved using contention free random access (CFRA) and/or contention based random access (CBRA). Radio access networks have a limited number of preambles available for the random access sequence and have reserved some of the preambles under certain circumstances. Because existing random access procedures do not reserve random access preambles for dual connectivity connections, UEs attempting to create a dual connectivity connection must utilize CBRA and contend with UEs that are attempting to access standalone connections using random access processes, negatively affecting the success rate for UE's attempting to establish a dual connectivity connection. The present disclosure reserves random access preambles for UEs associated with dual connectivity sessions and uses CFRA to increase the success rate of the random access process for said UEs.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
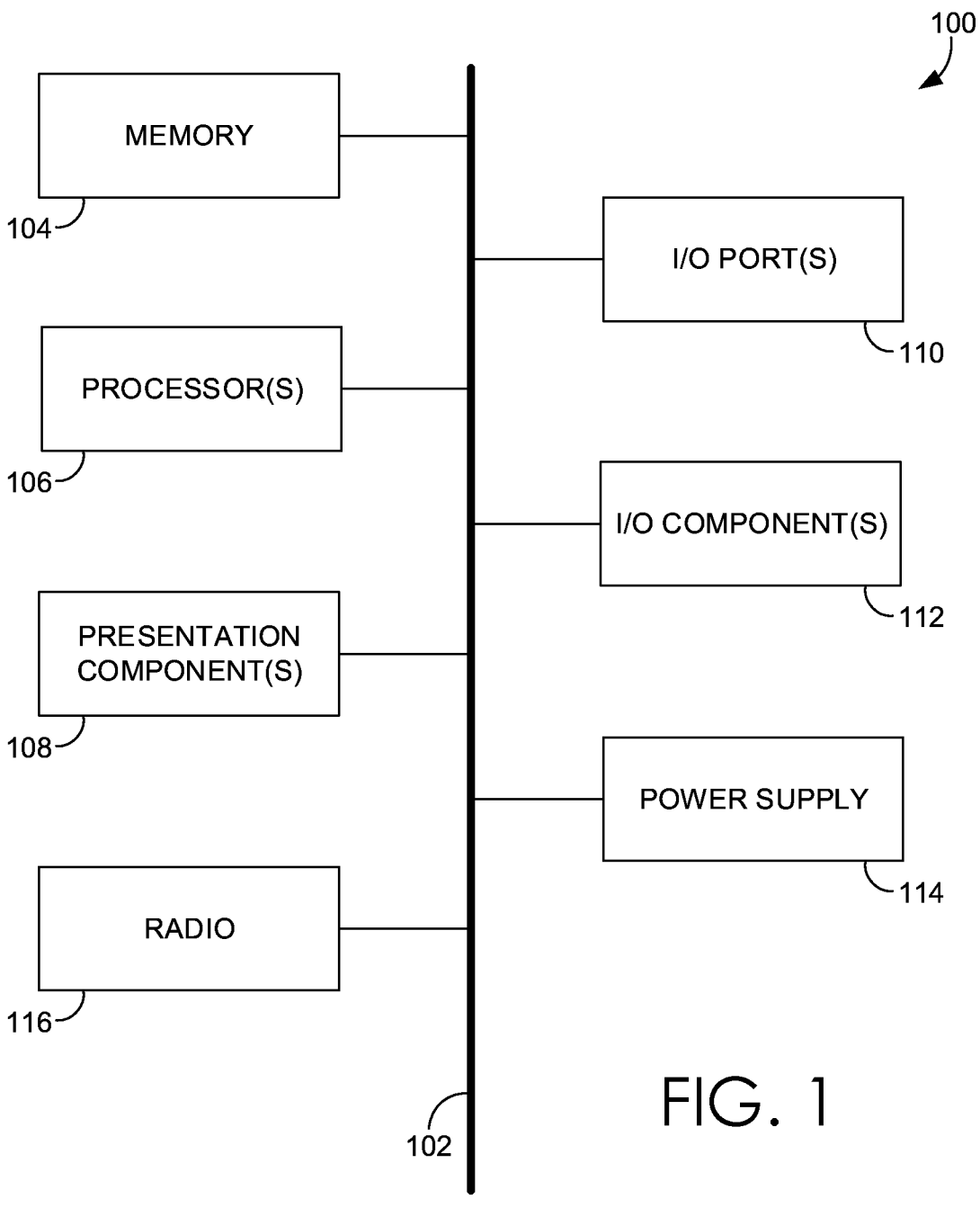
FIG. 1 illustrates an exemplary computing device for use with the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD- ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, UEs use the random-access processes to gain access to cells for a variety of reasons, including for gaining initial access to the network from the idle state, regaining access to the network after a radio link failure, gaining timing synchronization with a new cell as part of the handover process, regaining uplink time alignment, requesting uplink grant for UE without dedicated scheduling request resource, and others. The random-access process allows multiple UEs, transmitting different random access preamble codes in uplink on the physical random access channel (PRACH), to gain simultaneous access to a cell. The random access process improves access to the network, operation of handover, successful transmission of downlink and uplink data and successful UE paging.

There are two different forms of the random-access process, Contention Free Random Access (CFRA) and Contention Based Random Access (CBRA). The Contention Free Random Access (CFRA) process is initiated by the network and uses a dedicated random access preamble code allocated to the UE for a limited period. In CFRA, a preamble code is randomly chosen by the UE, resulting in possibility for more than one UE simultaneously transmitting the same code, thus requires subsequent attempts to resolve the contention. The CFRA process is used when the UE is known to the network. The CFRA process involves three phases and uses a preamble code dedicated to one UE to increase the probability of success of the random access process, leading to faster cell access. In CBRA, the network allocates a dedicated preamble code to a UE, resulting in contention-free access. This is faster than contention-based access—a factor, which is particularly important for the case of handover, which is time-critical. CBRA can also be initiated by the network. The Contention Based Random Access (CBRA) process is initiated by the UE to gain access to the network. It involves the UE selecting a random access preamble code from a list of codes available for selection by all UE in the cell. CBRA requires additional signaling to resolve contention that may occur when multiple UE attempts to access the cell in the same PRACH subframe using the same preamble code.

Existing solutions doesn't dedicate the preambles of MR-DC connections in M-NG RAN RACH and S-NG RAN RACH processes. There is neither dedicating of preambles for the MR-DC connections nor for some MR-DC connections over the other. This means the MR-DC connections must compete with standalone connections in the RACH process. This is a hurdle to have a higher success rate for MR-DC connections. In order to solve this problem, systems and methods of the present disclosure employ a differentiated way of handling the RACH preamble assignment for Multi Rat Dual connectivity connections and improve the random-access success rate for those connections. Such an improvement improves customer experience in Cellular networks involving Multi Rat Dual connectivity by influencing the selection of the preambles needed for the random-access process Accordingly, a first aspect of the present disclosure is directed to a method for managing contention free random access in a dual connectivity session, the method comprising receiving an access request from a UE comprising one or more call quality indicators. The method further comprises determining, based on the one or more call quality indicators, that the access request is for a dual connectivity connection. The method further comprises, based on said determination, communicating a first random access preamble to the UE.

A second aspect of the present disclosure is directed to a system comprising a first node configured to wirelessly communicate with a UE and a second node configured to wirelessly communicate with the UE. The system further comprises one or more computer processing components communicatively coupled to each of the first node, the second node, and the UE, and configured to perform a method comprising receiving, from the UE, one or more call quality indicators indicating that the UE is requesting access to each of the first node and the second node. The method further comprises communicating a first random access preamble for a first random access procedure and a second random access preamble for a second random access procedure to the UE, wherein the first random access procedure is used by the UE to access the first node and the second random access procedure is used by the UE to access the second node.

According to another aspect of the technology described herein, one or more computer-readable media is provided having computer-executable instructions embodied thereon that, when executed, cause the one or more processors to perform a method comprising receiving, from the UE, one or more call quality indicators indicating that the UE is requesting access to a dual connectivity connection. The method further comprises determining, based at least in part on the one or more call quality indicators, a priority level associated with the UE. The method further comprises based on a determination that the priority level exceeds a predetermined threshold, communicating a random access preamble to the UE for use in contention free random access. The method further comprises, based on a determination that the priority level is below the predetermined threshold, withholding a random access preamble from the UE.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include equipment types identified by the GSMA, including mobile/feature phones, smart phones, tablets, IoT devices, wearable devices, dongles, modems, and WLAN routers, each of which may have any one or more components depicted in FIG. 1.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VOIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
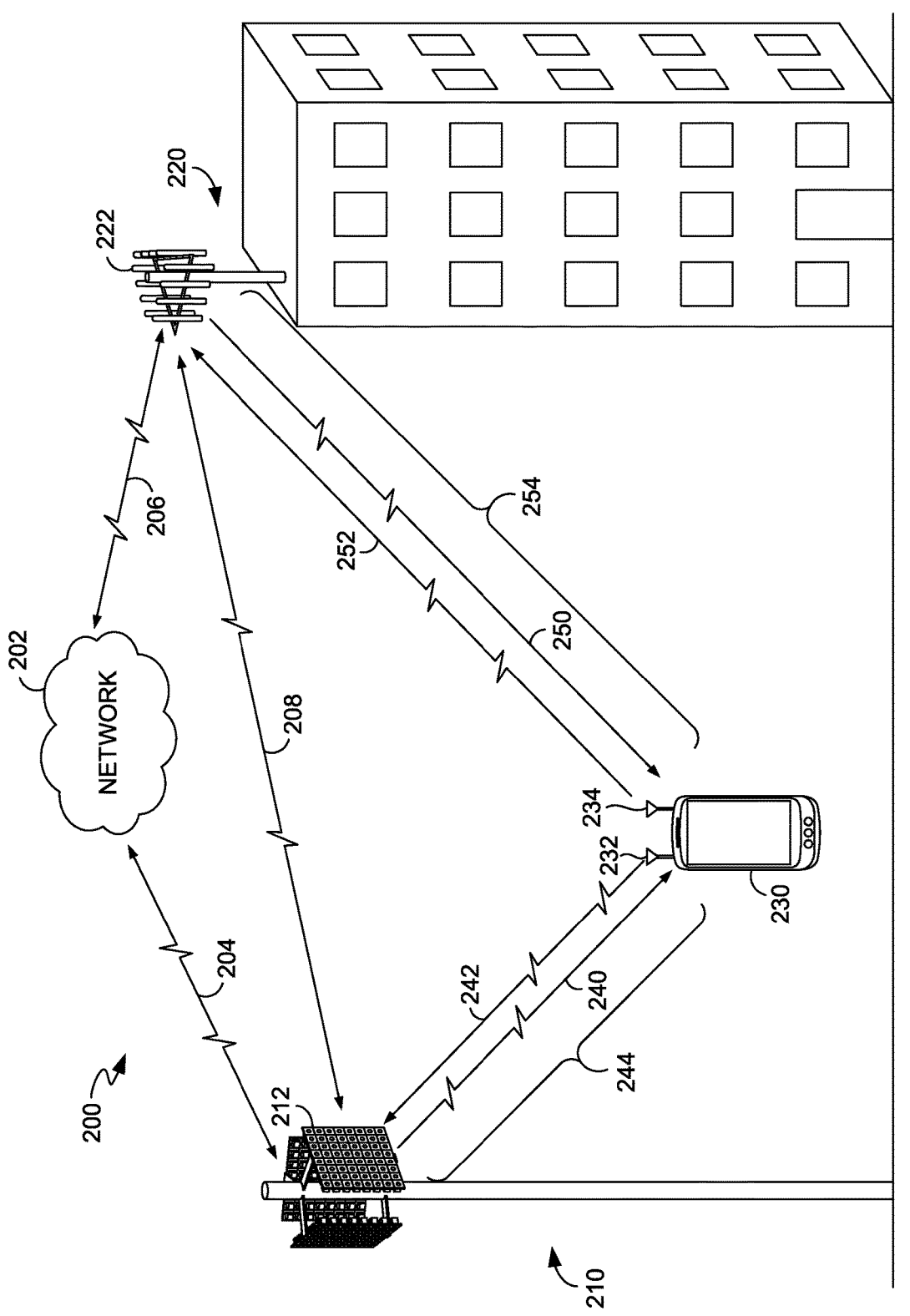
FIG. 2 illustrates a diagram of an exemplary network environment in which implementations of the present disclosure may be employed.

Turning now to FIG. 2, a dual connectivity wireless network environment 200 is illustrated. The network environment 200 comprises a first access point 210 and a second access point 220. Each of the first access point 210 and the second access point 220 are configured to wirelessly communicate with a UE 230, which may have any one or more aspects of the computing device 100 of FIG. 1. Though the first access point 210 is illustrated as a 5G base station and the second access point is illustrated as a 3G/4G base station, these representations are but one example of suitable configurations and are not intended to suggest any limitations as to the scope of use or functionality of embodiments described herein. Neither should the configuration be interpreted as having any dependency or requirement relating to any one or combination of components illustrated. Instead, the first access point 210 may be co-located with the second access point 220, and the first access point 210 and the second access point 220 may be part of a common base station or be part of different base stations. In some aspects, the first access point 210 comprises a 5G or MIMO access point, and the second access point 220 comprises a 4G or eNodeB access point. That is, the first access point 210 may wirelessly communicate with the UE 230 via a 5G wireless communication protocol, and the second access point 220 may wirelessly communicate with the UE 230 via a 4G wireless communication protocol. In other aspects, the first access point 210 may be configured to wirelessly communicate with the UE 230 via a first radio access technology and the second access point 220 may be configured to wirelessly communicate with the UE 230 via a second radio access technology; the first radio access technology may be different than the second radio access technology (e.g., 4G and 5G) or they may be the same (e.g., both 5G).

The first access point 210 may communicate a first wireless downlink signal 240 to the UE 230, and a first transmitter 232 of the UE 230 may communicate a first wireless uplink signal 342 to the first access point 210. The second access point 220 may communicate a second wireless downlink signal 250 to the UE 230, and a second transmitter 234 of the UE 230 may communicate a second wireless uplink signal 252 to the second access point 220. The first access point 210 is connected to the second access point 220, whether because they are controlled by the same base station, because of a connection via a network 302, or because of a direct interface 208 (e.g., X2 interface). With respect to dual connectivity processes, the present disclosure does not modify any portion of the conventional dual connectivity access, addition, modification, or handover processes—only the random access process for accessing one or more of the first access point 210 and the second access point 220. In some aspects, the first access point 210 may be referred to as a master node and the second access point 220 may be referred to as a secondary node, wherein the master node (the first access point 210) controls the dual connectivity process, including random access.

When the UE 230 requests access to the first access point 210, it may communicate one or more call quality indicators that indicate a quality of service and or priority level (e.g., an allocation and retention priority). The one or more call quality indicators may indicate that the UE 230 is attempting to connect to the network 202 using dual connectivity. Aspects of the present disclosure reserve random access preambles so that a random access preamble may be assigned to the UE 230 on the basis that it is associated with dual connectivity. Accordingly, once one the first access point 210, or any other networked component, determines, based on the one or more call quality indicators, that the UE 230 is attempting to connect using dual connectivity, one of the reserved random access preambles will be assigned to the UE 230 so that the UE does not have to utilize CBRA to access the first access point 210 and/or the second access point 220. In one aspect of the present disclosure, reserved dual connectivity random access preambles may only be assigned to the UE 230 if it is determined, based on the one or more call quality indicators, that the UE 230 is attempting to connect using dual connectivity and that connection being sought by the UE 230 is of greater than a predetermined threshold priority. For example, if the one or more call quality indicators may comprise an allocation and retention priority and the network operator has determined that random access preambles can be assigned to UEs requesting dual connectivity with an ARP greater than 8 (wherein priority increases as the value decreases, so a priority 2 is greater than a priority 8 and a priority 10 is lower than a priority 8), then the UE 230 will be granted a reserved random access preamble if its ARP is 5 and the one or more call quality indicators indicate that the UE 230 is attempting to connect using dual connectivity. Otherwise, if the UE 230 had an ARP of 8 or lower or if it were not accessing dual connectivity (e.g., it was attempting to access a standalone 5G network), the UE 230 would not receive a reserved random access preamble and would use CBRA to complete the random access process. Whether in non-standalone (NSA) 5G or in dual connectivity, each of the master node and the secondary node have 64 preambles that can be used for the RACH process. A carrier-defined number of preambles may be reserved/allocated and assigned for all NSA or dual connectivity connections or priority connections only. Any preambles not allocated/assigned to UEs are available for other UEs to complete CBRA, such as for accessing a standalone connections to either or both nodes. The allocation of random access preambles may be used to do random access as part of a secondary node addition, master node mobility, secondary node mobility, or any other random access procedure associated with NSA or dual connectivity connections.

Figure 3:
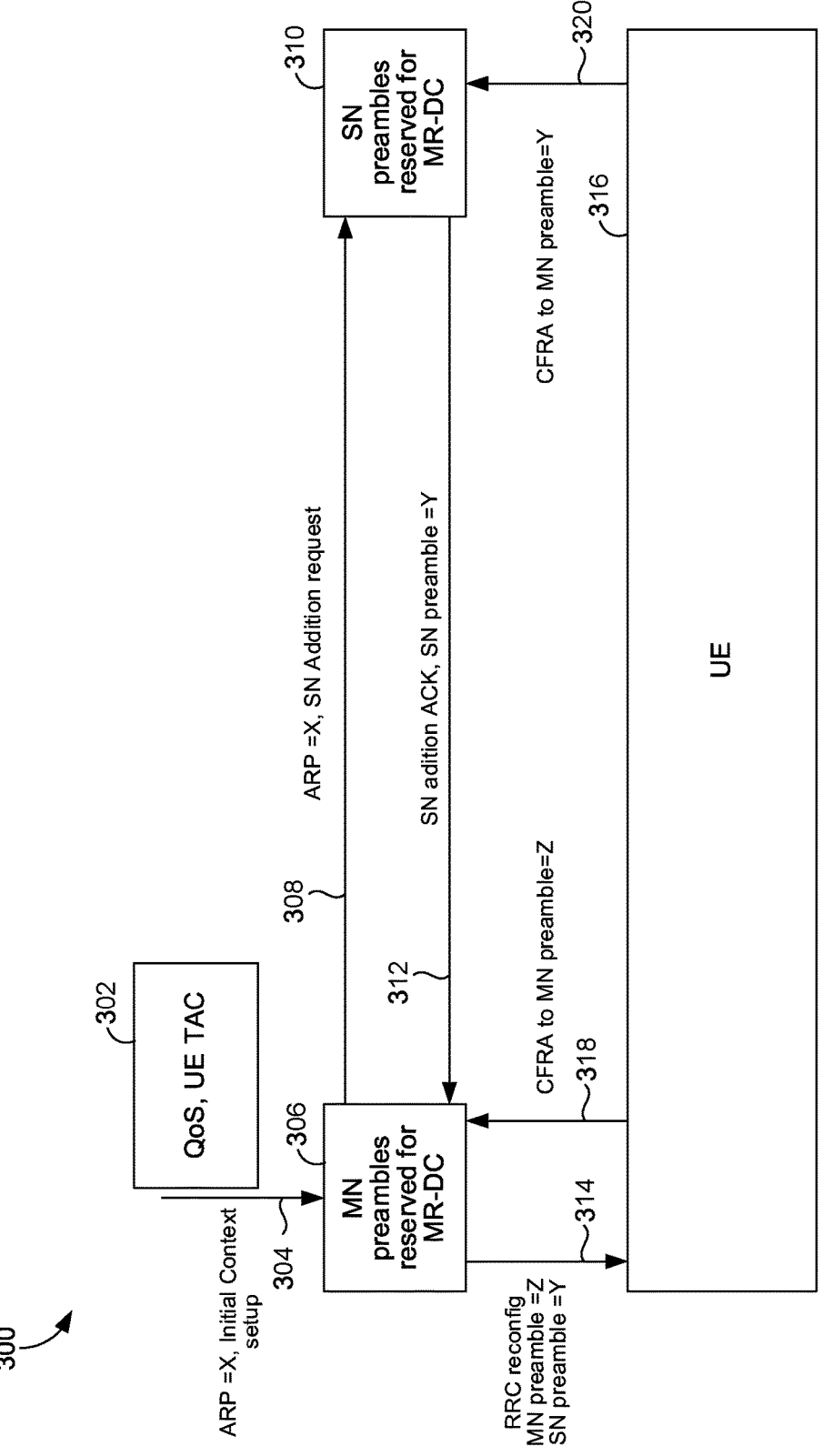
FIG. 3 illustrates a flow diagram of an exemplary method for filtering malicious or rogue devices in which implementations of the present disclosure may be employed.

Turning now to FIG. 3, a flow chart is illustrated in accordance with one or more aspects of the present invention. A method 300 for CFRA in dual connectivity connections is provided. At a first step 302, a network receives one or more call quality indicators from a UE 316, wherein the one or more call quality indicators may comprise parameters such as quality of service and ARP, and wherein the one or more call quality indicators indicates that the UE 316 is requesting to setup the initial context of a dual connectivity connection. At a second step 304, the network initializes the dual connectivity setup. At a third step 306, the master node reserves preambles for the UE 316 on the basis that the UE 316 is attempting to initialize dual connectivity. At a fourth step 308, the secondary node is informed that the UE 316 is attempting to initialize dual connectivity and the secondary node reserves random access preambles for the UE 316 on that basis. At a fifth step 312, the secondary node communicates an acknowledgement to the master node and indicates the random access preamble that the UE 316 should use to complete CFRA with the secondary node at a later step. At a sixth step 314, the master node communicates the reserved random access preamble for the master node and the reserved random access preamble for the secondary node to the UE 316. At a seventh step 318, the UE 316 completes CFRA with the master node using the reserved random access preamble for the master node. At an eighth step 320, the UE 316 completes CFRA with the secondary node using the reserved random access preamble for the secondary node.

Figure 4:
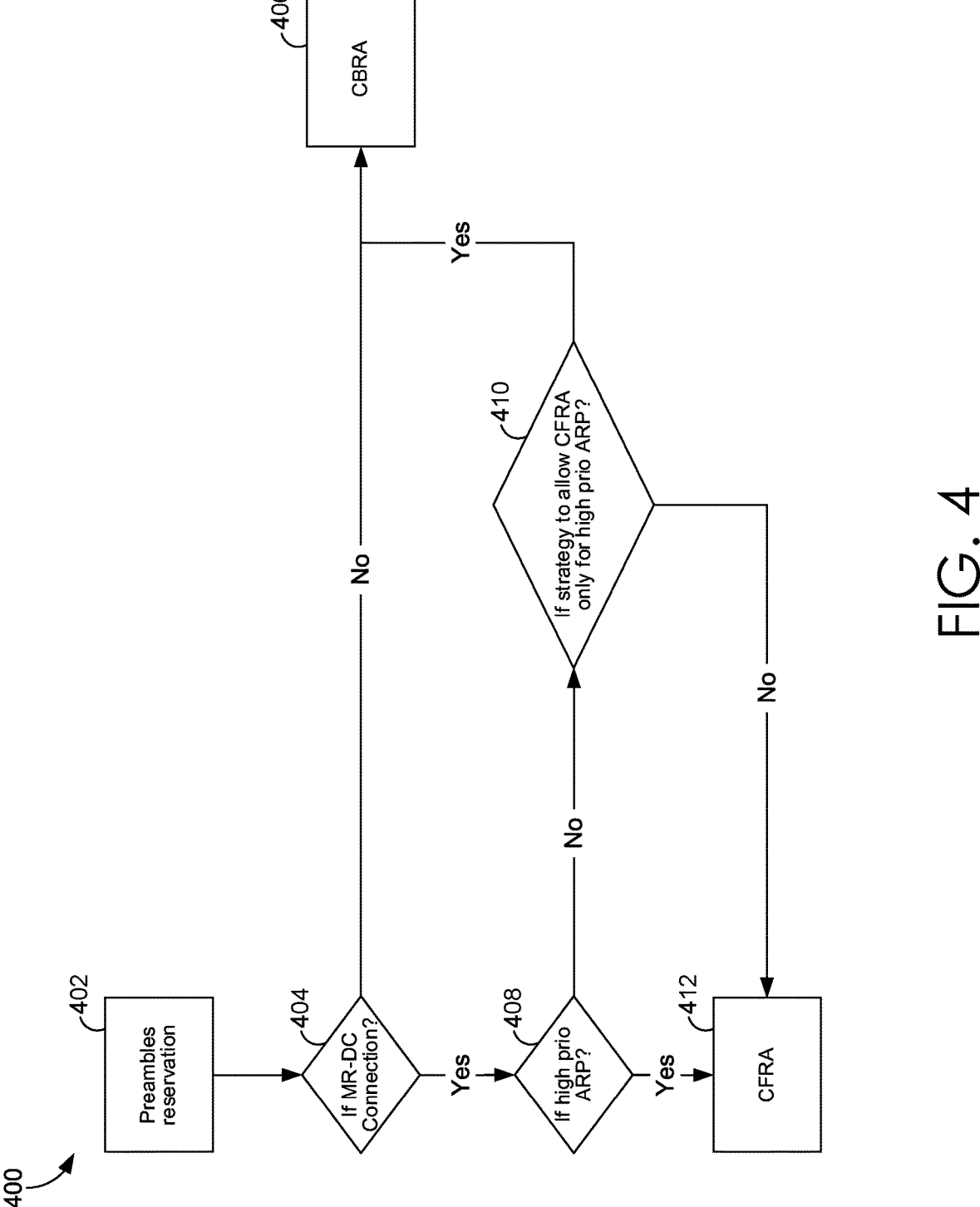
FIG. 4 depicts a flow diagram of an exemplary method for automated blacklisting devices, in accordance with embodiments described herein.

Turning now to FIG. 4, a method 400 is illustrated in accordance with priority-based CFRA for dual connectivity connections. At a first step 402, a component of a radio access network either reserves or is instructed to reserve at least a portion of the 64 random access preambles available to a master node and a secondary node. At a second step 404, it is determined if a UE requesting access to a node is requesting a dual connectivity connection (e.g., based at least in part on one or more call quality indicators communicated from the UE to the network. If the requesting UE is not indicated as attempting to initiate dual connectivity, the method 400 proceeds to a third step 406 and responds to the UE's access request by not transmitting a random access preamble to the UE, thereby naturally forcing the UE to use CBRA, or by affirmatively instructing the UE to use CBRA. If the UE is requesting dual connectivity at the second step 404, a priority of the UE's request is determined (e.g., based on an ARP value) at a fourth step 408; if the UE's request priority is not higher than a predetermined threshold, the method proceeds to a fifth step 410, else if the UE's request priority is higher than the predetermined threshold, the method proceeds to a sixth step 412. At the fifth step 410, it is determined if the UE's priority level is currently factored into random access decisions; the carrier may control if or when priority is factored, or if the decision is dynamic and based on one or more factors (e.g., time of day, traffic load, an identity (e.g., MVNO) associated with the UE, or any other desirable factor). If priority is factored at the fifth step 410 and because it was determined at the fourth step 408 that the UE is not sufficiently high priority, then the method proceeds to the third step 406 and the UE will use CBRA; If priority is not currently factored in random access, then the method 400 proceeds to the sixth step 412. At the sixth step 412, one or more preambles are assigned and communicated to the UE (e.g., a master node random access preamble and/or a secondary node random access preamble), according to any one or more aspects of FIG. 3, and the UE will use CFRA with the assigned preambles.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for managing contention free random access in a dual connectivity session, comprising:

determining that a first user equipment (UE) is configured for a dual connectivity session;

determining that a second UE is not configured for dual connectivity;

communicate, based on the first UE being configured for the dual connectivity session, a first random access preamble reservation to the first UE that causes the first UE to perform a contention free random access procedure; and not communicating, based on the second UE not being configured for dual connectivity, a random access preamble reservation to the second UE, wherein not communicating the random access preamble reservation to the second UE causes the second UE to perform a contention based random access procedure.

2. The method of claim 1, wherein determining that first UE is configured for the dual connectivity session and determining the second UE is not configured for dual connectivity is based on a one or more call quality indicators.

3. The method of claim 2, wherein the one or more call quality indicators comprises an allocation and retention priority.

4. The method of claim 3, wherein the dual connectivity session comprises a first connection between the first UE and a master node and a second connection between the first UE and a secondary node.

5. The method of claim 4, wherein the master node is configured to communicate with the first UE according to a first radio access technology and the secondary node is configured to communicate with the first UE according to a second radio access technology.

6. The method of claim 5, wherein at least one of the first radio access technology and the second radio access technology is 5G.

7. The method of claim 6, wherein the second radio access technology is 5G and the one or more call quality indicators comprise an indication that the first UE is requesting access to a non-standalone 5G network comprising the secondary node.

8. The method of claim 7, wherein the first radio access technology is different than the second radio access technology.

9. The method of claim 1, wherein communicating the first random access preamble to the first UE is further based on a determination that the one or more call quality indicators comprises a priority level higher than a predetermined threshold.

10. A system for managing contention free random access in a dual connectivity session, the system comprising:

a first node configured to wirelessly communicate with a plurality of user equipment (UE), the plurality of UE comprising a first UE and a second UE; and one or more computer processing components communicatively coupled to the first node and configured to perform a method comprising:

communicating a first random access preamble reservation to the first UE that causes the first UE to perform a contention free random access procedure based on receiving, from the first UE, an indication that the first UE is configured to support a dual connectivity connection with the first node and a second node; and not communicating a random access preamble reservation to the second UE based on receiving, from the second UE, an indication that the second UE is not configured to support a dual connectivity session with the first node and the second node, wherein not communicating the random access preamble reservation to the second UE causes the second UE to perform a contention based random access procedure.

11. The system of claim 10, wherein communicating the first random access preamble to the first UE is further based on one or more network factors being satisfied.

12. The system of claim 11, wherein the one or more factors comprises a time of day.

13. The system of claim 11, wherein the one or more factors comprises a traffic load of the first node.

14. The system of claim 11, wherein the one or more factors comprises an identity associated with the first UE.

15. The system of claim 11, wherein the one or more computer processing components are further configured to not communicate a random access preamble to a third UE based on the one or more network factors not being satisfied and based on a determination that a request from the third UE has a priority level below a configurable threshold priority, and wherein not communicating the random access preamble to the third UE causes the third UE to perform the contention based random access procedure.

16. The system of claim 10, wherein communicating the first random access preamble to the first UE is further based on a determination that one or more call quality indicators comprises a priority level higher than a predetermined threshold.

17. One or more non-transitory computer-readable media having computer-executable instructions embodied thereon that, when executed, cause the one or more processors to perform a method comprising:

determining that a first user equipment (UE) is configured for a dual connectivity session;

determining that a second UE is not configured for dual connectivity;

communicate, based on the first UE being configured for the dual connectivity session, a first random access preamble reservation to the first UE that causes the first UE to perform a contention free random access procedure; and not communicating, based on the second UE not being configured for dual connectivity, a random access preamble reservation to the second UE, wherein not communicating the random access preamble reservation to the second UE causes the second UE to perform a contention based random access procedure.

18. The one or more non-transitory computer readable media of claim 17, wherein communicating the first random access preamble to the first UE is further based on a determination that one or more call quality indicators comprises a priority level higher than a predetermined threshold.

19. The one or more non-transitory computer readable media of claim 17, wherein communicating the first random access preamble to the first UE is further based on one or more network factors being satisfied.

20. The one or more non-transitory computer readable media of claim 19, wherein the one or more computer processing components are further configured to not communicate a random access preamble to a third UE based on the one or more network factors not being satisfied and based on a determination that a request for a dual connectivity session from the third UE has a priority level below a configurable threshold priority, and wherein not communicating the random access preamble to the third UE causes the third UE to perform the contention based random access procedure.

\* \* \* \* \*